United States Patent
Frickenstein et al.

(10) Patent No.: US 12,530,276 B2
(45) Date of Patent: Jan. 20, 2026

(54) COMPUTER-IMPLEMENTED METHOD AND SYSTEM FOR LEARNING-BASED ANOMALY DETECTION IN ORDER TO DETERMINE A SOFTWARE ERROR IN A NETWORKED VEHICLE

(71) Applicant: Bayerische Motoren Werke Aktiengesellschaft, Munich (DE)

(72) Inventors: Alexander Frickenstein, Inning a. Ammersee (DE); Maik Kowol, Sankt Wolfgang (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 166 days.

(21) Appl. No.: 18/564,803

(22) PCT Filed: Apr. 11, 2022

(86) PCT No.: PCT/EP2022/059601
§ 371 (c)(1),
(2) Date: Nov. 28, 2023

(87) PCT Pub. No.: WO2023/001416
PCT Pub. Date: Jan. 26, 2023

(65) Prior Publication Data
US 2024/0378137 A1      Nov. 14, 2024

(30) Foreign Application Priority Data
Jul. 22, 2021   (DE) ..................... 10 2021 118 972.1

(51) Int. Cl.
*G06F 9/44*       (2018.01)
*G06F 11/3604*  (2025.01)
(Continued)

(52) U.S. Cl.
CPC ...... *G06F 11/3636* (2013.01); *G06F 11/3608* (2013.01); *G06N 3/042* (2023.01); *G06N 3/09* (2023.01)

(58) Field of Classification Search
CPC ............. G06F 11/3636; G06F 11/3608; G06N 3/09; G06N 3/042
See application file for complete search history.

(56) References Cited

U.S. PATENT DOCUMENTS 10,977,561 B2 *  4/2021  Sun .......................... G06N 5/02
2019/0036760 A1  1/2019  Tee et al.
(Continued)

FOREIGN PATENT DOCUMENTS

DE     20 2017 005 070 U1    12/2017

OTHER PUBLICATIONS

International Search Report (PCT/ISA/210) issued in PCT Application No. PCT/EP2022/059601 dated Jul. 20, 2022 with English translation (4 pages).
(Continued)

*Primary Examiner* — Qamrun Nahar
(74) *Attorney, Agent, or Firm* — Crowell & Moring LLP

(57) ABSTRACT

Systems, methods, and apparatuses are provided for learning-based anomaly detection to determine a software error in a networked vehicle. Trace lines are translated using a controller of the vehicle. A node list with weighted links is input into a graph neural network. Similarities and dependencies of each node are output as embedded features in a floating-point format with respect to other nodes of the node list in an embedded representation and for each node of the node list. Embedded features of nodes are sorted into a temporal sequence based on a timestamp of each translated trace line. The embedded features of the nodes are augmented with similar embedded features of nodes determined (Continued)

using a distance metric. Similar embedded features are input into a deep neural network together with the embedded features. A time of an error probability and/or error class of an anomaly is output to determine the software error.

14 Claims, 6 Drawing Sheets

(51) Int. Cl.
*G06F 11/362* (2025.01)
*G06N 3/042* (2023.01)
*G06N 3/09* (2023.01)

(56) References Cited

U.S. PATENT DOCUMENTS

2019/0340392 A1* 11/2019 Khorrami ........... G06F 11/3612
2020/0331465 A1* 10/2020 Herman .................. G06N 3/08

OTHER PUBLICATIONS

German-language Written Opinion (PCT/ISA/237) issued in PCT Application No. PCT/EP2022/059601 dated Jul. 20, 2022 with English translation (10 pages).
German-language Office Action issued in German Application No. 10 2021 118 972.1 dated Nov. 22, 2021 (6 pages).
Jia, T. et al.; "An Approach for Anomaly Diagnosis Based on Hybrid Graph Model with Logs for Distributed Services", 2017 IEEE 24th International Conference on Web Services (ICWS), Jun. 25, 2017, pp. 25-32, XP033150861 (8 pages).

* cited by examiner

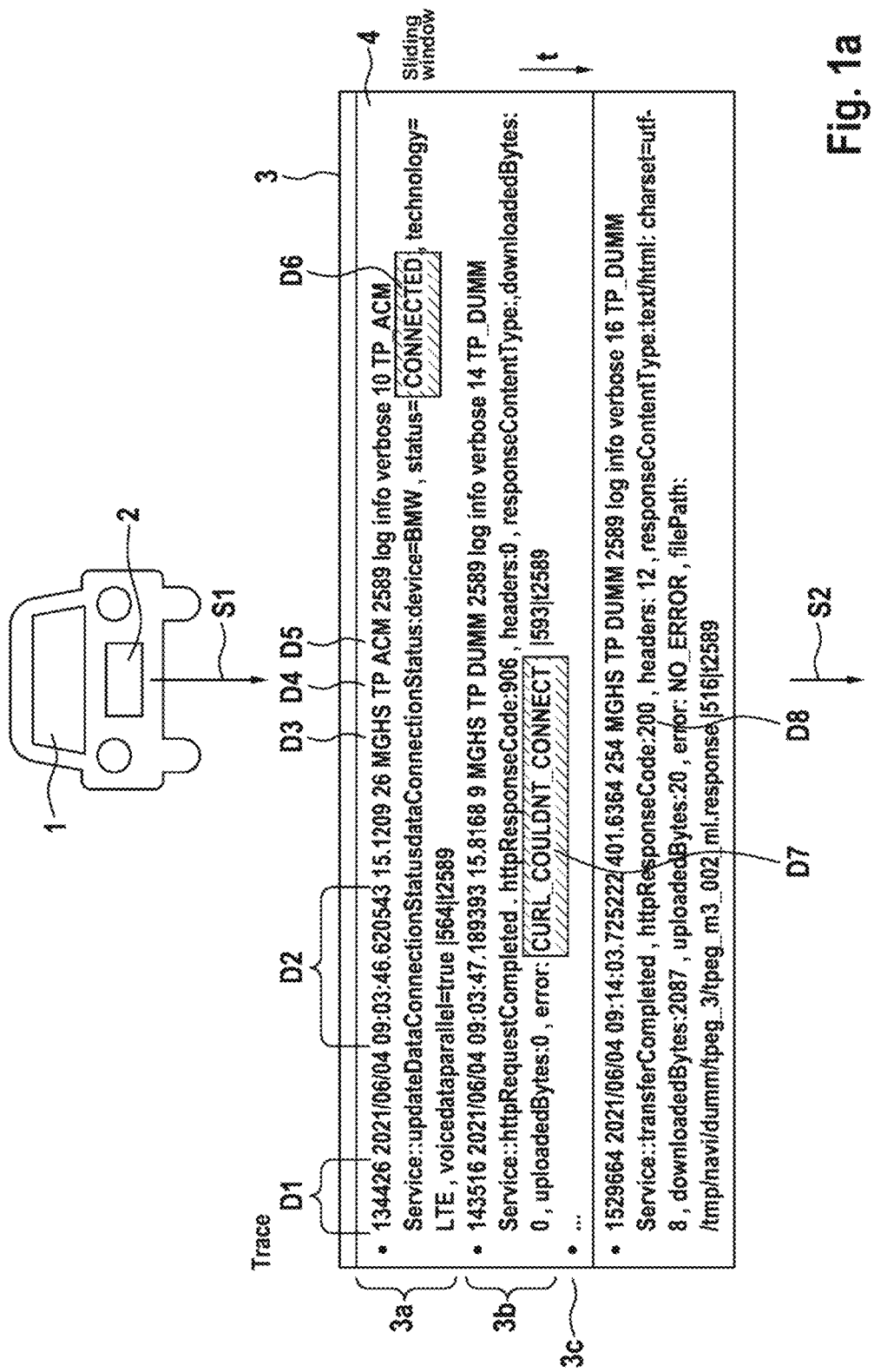

COMPUTER-IMPLEMENTED METHOD AND SYSTEM FOR LEARNING-BASED ANOMALY DETECTION IN ORDER TO DETERMINE A SOFTWARE ERROR IN A NETWORKED VEHICLE

BACKGROUND AND SUMMARY

The present subject matter relates to a computer-implemented method for learning-based anomaly detection in order to determine a software error in a networked vehicle. The present subject matter also relates to a system for learning-based anomaly detection in order to determine a software error in a networked vehicle. The present subject matter further relates to a computer program and computer-readable data carrier.

As a result of increased networking of mobility, data-based services are experiencing a steep increase in respect of complexity and user numbers. Core features of such services in the context of mobility include the provision of relevant functionality outside of and within the vehicle to the user, on the basis of vehicle data. In this context, the expectations of users, shaped by the fast-paced field of consumer electronics, demand rapid augmentation of functionalities within short update cycles. Accordingly, the infrastructure providing vehicle data for such services requires great flexibility in order to be able to react in timely fashion to new or modified requirements during the service life of the vehicle.

It is thus important to obtain significant test validation during the development phase and, at the same time, identify and eliminate as many errors as possible in new software components. A consequence of the modern continuous development processes is that it is no longer possible to keep a strict separation between development phase and application phase at the customer. However, the reduction in the test validation resulting from this leads to great challenges in respect of the quality of applications that the customer may experience. In the case of customer vehicles, in particular, there is only limited scope for recording trace data in the field and providing these to the developers for error analysis. This makes it necessary to identify all errors as quickly as possible within the scope of a short development phase. On account of the large state space (connection status, networking technology, network provider, etc.) of networked systems, the ambient parameters (installed/used applications) and other influencing variables, the testing requires the use of a test fleet equipped with recording equipment for trace data. Trained testers are tasked with carrying out various tests with the vehicles and informing the developers about arising problems. Even if new software components can be installed in the vehicle within the scope of remote software updates, which is to say a firmware over the air mechanism, as a matter of principle, the errors which impair the connection of the vehicle to the backend harbor a particularly high risk for a vehicle producer since a lack of network connection means that new software components cannot be installed, or can only be installed badly, from a distance, which is to say remotely. Therefore, there is the need to obtain greater test coverage within a development phase, which is short in any case, and to make the work for testers and developers easier.

It is an object of the present subject matter to provide an anomaly detection in order to determine a software error in a networked vehicle, which can be used for a fast, efficient and reliable determination of the software error and which can be adapted flexibly to different software errors. The anomaly detection should further allow the identification of software errors in networked vehicles and the localization of these software errors in the trace data such that trace data related to the software error can be displayed to a tester and/or developer, which is to say user.

In the computer-implemented method according to the present subject matter for learning-based anomaly detection in order to determine a software error in a networked vehicle, trace lines of a trace, for example available in the DLT (diagnostic log and trace) format, as a file with a temporal sequence of function calls of software components of a controller, output by this controller of the vehicle, are translated into a graph representation of an undirected graph, wherein a node list with weighted links between the nodes is provided, which each represent individual data segments of the translated trace lines. The node list is input into a graph neural network, wherein, in an embedded representation and for each node of the node list, similarities and dependencies of this node to other nodes in the node list are output as embedded features, for example in the floating-point format. The embedded features of nodes of a plurality of temporally successive trace lines are sorted into a temporal sequence on the basis of a timestamp of each translated trace line and the embedded features of the nodes of the plurality of temporally successive trace lines are augmented/complemented with most similar embedded features of the nodes determined using a distance metric proceeding from the nodes of at least one of the plurality of temporally successive trace lines. The most similar embedded features are input into a deep neural network together with the embedded features of the nodes of the plurality of temporally successive trace lines, wherein a time of an error probability and/or error class of an anomaly in the plurality of temporally successive trace lines is output in order to determine the software error.

An anomaly is defined as any form of erroneous behavior in the translated trace lines. The erroneous behavior may in particular relate to function calls, which are encompassed by one or more trace lines as data segments. A non-implemented, incorrect or delayed function call or a missing, incorrect or delayed occurrence of a value may be considered to be an anomaly. A software error is defined as any error as a consequence of an execution of a program or part of a program, which, mapped by the trace lines, runs on one or more software components of the controller of the vehicle, wherein the error may create the anomaly and may appear as an anomaly.

The term vehicle covers automobiles, trucks, buses, motorhomes, motorcycles, etc. used for conveying people, goods, etc. The term in particular covers motor vehicles for conveying people. Additionally or alternatively, the hybrid or electric vehicle according to examples may be a pure electric vehicle (BEV) or a plug-in hybrid vehicle (PHEV). However, other forms of drive may also be used, for example in the form of a diesel or gas-operated vehicle. The vehicle may also be in the form of a rail vehicle. The vehicle may be networked with one or more other vehicles and/or a backend. The type of networking can be implemented wirelessly by radio, WLAN, LTE, GSM or any other wireless transmission standard such as Bluetooth, etc.

Traces are files which for example follow the DLT format by AUTOSAR. They are used to store information when developing and testing vehicles. Traces consist of a plurality of trace lines. Trace lines may contain the following data segments (this list is non-exhaustive):

index (position of the trace line within the trace; may be present as a six-digit number)

timestamp (the absolute Unix time in seconds and milliseconds is used to calculate an absolute time with date)

time (contains the time elapsed since the ECU was started)

ECU ID (also ECU; the unique address of the controller in the vehicle transmitting the trace line, for example navigation system, telematics controller, motor controller)

application ID (also APID; the ID of an APP grouping various software classes, methods and functions, for example telematics (TP), which is to say a group pooling various telematics functions, such as HTTP (DUMM), MQTT)

context ID (also CTID; a specific software class/method or function such as HTTP, MQTT)

TYPE (describes the type of trace line, for example log)

payload (pieces of information about state changes, methods/function calls, variables, values and/or error messages from the software classes/methods and functions).

The data segments can be separated from one another using spaces, commas, semicolons, tabs or in any other way. An example of a trace line is listed below:

| Index | Timestamp(formatted) | Time | ECU | APID | CTID | TYPE |
|---|---|---|---|---|---|---|
| 17161 | 2021/04/01 06:34:02.439227 | 1274.0110243 | MGHS | TP | DUMM | 2542 log info verbose |

Payload

TP_DUMM Service::*startHTTPTransfer* Start *HttpTransfer* (POST):[1463]*t*2542

The following trace lines show that the vehicle goes online, and also an erroneous HTTP request and a successful one. Moreover, the traces include information about the time, the controller, and the software components.

133881 2021/06/04 09:08:46.590010 15.0897 21 MGHS TP CNCT 2589 log info verbose 3 TP_CNCT ATMDeviceAdapter::onIfTelephoneAvailable true l361lt2589

13895 2021/06/04 09:08:46.592079 19.0954 32 MGHS TP CNCT 2589 log info verbose 3 TP_CNCT ATMDeviceAdapter::onIfDataCommunicationAvailable true l336lt2589

133941 2021/06/04 09:08:46.593022 15.1202 23 MGHS TP ACM 2589 log info verbose to TP_ACM Service:: updateDataConnectionStatus dataConnectionStatus: device=BMW, status: NO_DEVICE, technology=UNKNOWN, voicedataparallel=false l564lt2589

134423 2021/06/04 09:08:46.620540 15.1208 52 MGHS TP CNCT 2589 log info verbose 19 TP_CNCT Service::updateDeviceStatus updatedDeviceStatus: DEV ATM CSD Connected CSV Unknown HWS true TE MT true MT T NI NMCC: 232NMNC: 0 3SMCC: 2325MNC:003RS:RegisteredAndRoaming NG 8l647lt2589

134426 2021/06/04 09:08:46.620543 15.1209 26 MGHS TP ACM 2589 log info verbose 10 TP_ACM Service: updateDataConnectionStatus dataConnectionStatus: device=BMW, status=CONNECTED, technology=LTE, voicedataparallel=true l564lt2589

143516 2021/06/04 09:08:47.169398 15,8168 9 MGHS TP DUMM 2589 log info verbose 14 TP_DUMM Service::httpRequestCompleted, httpResponseCode: 906, headers: 0, responseContentType:, downloadedBytes: 0, uploadedBytes: 0, error; HTTP_ERROR l593lt2589

239512 2021/06/04 09:0832.407698 73.0059 69 MGHS TP DUMM 2589 log info verbose 14 TP_DUMM Service:httpRequestCompleted, httpResponseCode: 200, headers: 5, responseContentType: application/json, downloadedBytes: 32255, uploadedBytes: 0, error: NO_ERRORl593lt2589

Within the scope of the graph representation, a graph consists of a set of nodes and edges. Edges connect the respective nodes and can be classified as directed and undirected edges. While directed graphs often represent a hierarchy or certain path, the edges in undirected graphs do not follow a fixed path, which is why it is possible to travel from node A to B and back again along the same path, which is to say from B to A. Moreover, edges can be provided with a weighting which specifies how strongly or weakly the connectivity between adjacent nodes is manifested. The more frequently the same nodes are directly connected to one another via an edge for a given trace, the higher the connectivity between these nodes. The undirected graph can be used to identify relationships between any information on nodes, independently of a level of a trace line, which is to say between different trace lines.

A graph neural network serves as a latent representation of a graph in the vector space. The vectors representing words contain a term of similarity with respect to one another, which is to say two words which are similar to one another tend to be closer together in the vector space, which is to say the scalar product of the two vectors is large. Moreover, the vectors find use in various downstream problems such as classification, clustering, etc. While there are many solutions for embedding a word or an image as a vector, graph neural networks can be used to do this for graphs. DeepWalk is a special example of a graph neural network (see arXiv1403.6652v2 [cs. SI], Jun. 27, 2014).

The distance metric, by means of which the most similar embedded features are determined proceeding from the nodes of at least one of the plurality of temporally successive trace lines, can be described as a metric used to determine nodes which, in an undirected graph, are arranged spaced apart from one or more nodes of at least one of the plurality of temporally successive trace lines at a predetermined distance of X edges, where X is an integer greater than or equal to 1, and/or Y edges, Y less than X. The distance metric can be designed as a cosine similarity. The cosine similarity is a similarity measure which can be used to compare documents or which, for example, specifies a hierarchy of documents in relation to a given vector of search terms. Let x and y be two vectors for comparison. Using the cosine similarity as a similarity metric, the following arises:

$$sim(x, y) = \frac{x \cdot y}{\|x\|\|y\|}, \quad (1)$$

where $\|x\|$ denotes the Euclidean norm of the vector $x=(x_1, x_2, \ldots, x_p)$, defined as $\sqrt{x_1^2+x_2^2+\ldots+x_p^2}$. Conceptually, this is the length of the vector. Similarly, ||y|| is the Euclidean norm of the vector y. The metric calculates the cosine of the angle between the vectors x and y. A cosine value of 0 means that the two vectors are oriented at 90° to one another (are orthogonal to one another) and have no correspondence. The closer the cosine value is to 1, the smaller the angle and the greater the correspondence between the vectors.

Even if an anomaly detection, also referred to as anomaly identification, is possible using one networked vehicle, the present subject matter does enable anomaly detection using a plurality of test vehicles which record a state and a function of operational software components, using their respective ECU (electronic control unit), also referred to as a controller. The logs or else traces are stored in a non-transitory computer-readable storage medium for subsequent analysis. For example, the traces contain information about the temporal sequence of function calls and software components, their states, error codes, and a software version. Once the test drive has been completed, the traces are read from the vehicle and made available to the users/developers for analysis purposes. Analogously, the interactions with the backend, which is networked with the vehicle and which communicates with the vehicle, are stored. Moreover, traces regarding the intended behavior for software components and regarding already analyzed and known errors are available.

The method according to the present subject matter for anomaly detection comprises a deep neural network algorithm capable of learning, which processes the traces output by the vehicle sequentially in time. A recurrent neural network, for example a long short-term memory (LSTM), is particularly suitable for learning time-sequential data. A temporal relationship between individual traces can be learned. For example, it is possible to observe how an HTTP request by an application such as for example a weather forecast is transmitted via the user interface of the vehicle to the data interface of the telematics platform as a consequence of a data update. Moreover, it is advantageous to fuse the traces recorded in the vehicle with the traces from the backend in order to augment the data set with further information for learning purposes. Traces from the backend provide additional data and therefore cannot, on their own, provide sufficient evidence for the cause of a software error in the vehicle. However, they may provide information about a general connection problem during data transfer at the network provider.

However, most errors occur in the context of executing a specific application or a sequence of key combinations. This fact makes it more difficult to reproduce an error and identify its actual cause. Therefore, the present subject matter provides for the deep neural network for temporal evaluation of the trace to be augmented with the output from a further neural network in the form of a graph neural network, which can be used to identify a relationship between individual trace lines if there is no, or only a distant, temporal relationship present between the trace lines.

According to the present subject matter, the traces used for anomaly detection in a distributed system, consisting of one or more controllers and applications which communicate with one another via different interfaces, are translated into a graph representation as an undirected graph. The relationships between trace lines are identified using a graph neural network. The graph neural network demonstrates its effectiveness, in particular, whenever data segments of a cause-effect relationship from one or more trace lines are not directly related or the occurrence thereof is significantly decoupled in time. In relation to the aforementioned weather forecast, queries may be greatly delayed in time due to download priorities, system loads, or poor data connections. It is also conceivable for the temporal synchronization of output traces not to be available. The graph neural network can be used to learn a semantic of trace lines and indicate a relation/relationship between trace lines. The graph neural network can also be used to learn an embedded representation of the traces and draw conclusions about related traces that are not in a temporal context with one another.

The anomaly detection method according to the present subject matter, in which output data from the graph neural network form input data of the deep neural network such that the embedded features of the nodes of the plurality of temporally successive trace lines are augmented/complemented by the most similar embedded features of nodes determined using the distance metric proceeding from nodes of at least one of the plurality of temporally successive trace lines, allows a fast, efficient, and reliable determination of erroneous behavior of the translated trace lines and, by way of the time of the anomaly, an identification and determination of the software error creating the anomaly, especially in the case of long effective chains, for example: establishing a connection at the telematics controller→transmitting the connection status to the navigation system/multimedia controller→authentication with a backend.

Determining a software error is understood to mean that, in particular, a software error is determined and at least one indicator is available, on the basis of which the software error can be identified. Identifying a software error is understood to mean that the software error is assigned an error class. Locating a software error is understood to mean that trace lines related to the software error, which are also referred to as relevant trace lines, are determined within the considered trace.

The anomaly detection method can be trained and further refined, which is to say retrained, fluently using the trace data of a test fleet of vehicles. Moreover, trace lines of the intended behavior and trace lines of known errors can be used as ground truth for supervised learning.

It is advantageous if N temporally successive trace lines and most similar embedded features of M nodes are used in a sliding window for input into the deep neural network. The sliding window can have a constant or variable size, referring to the number of acquired trace lines, when traversing the trace. A speed of traversing the trace can be constant or variable, and may depend on the evaluation speed of the anomaly detection method.

It is advantageous if only the trace line with the most recent timestamp from the N temporally successive trace lines of the sliding window is used to determine the most similar embedded features, with the most similar embedded features of the M nodes being determined using the distance metric proceeding from the nodes of the trace line with the most recent timestamp. This increases the evaluation speed vis-à-vis the use of a plurality or all of the trace lines of the sliding window and is sufficient in order to determine the most similar embedded features. In an advantageous example, the distance metric is provided as a cosine similarity, Euclidean distance metric or weighted Euclidean distance metric, in order to provide a fast and efficient distance metric.

In a further example, in which M is substantially equal to N, in particular M is set equal to N, and M is set equal to 3, 10 or 64 in particular, it was found that it is possible to obtain a particularly fast and reliable result of the anomaly detection. If M is substantially equal to N, the most similar embedded features particularly efficiently complement the embedded features of the nodes of the plurality of temporally successive trace lines, in order to determine a software error even without or with only a small temporal correlation between the nodes related to the software error. Other relationships of M to N are possible.

For the assignability of the nodes of the node list to the data segments of the trace lines, it is advantageous if the node list with the weighted links between the nodes, in particular links between two nodes, is complemented by a lookup table, in which each node of the translated trace lines, which may be denoted by a running integer index, is assigned a distinguishable label of numbers and/or letters. Using the lookup list, it is possible to easily and quickly trace a node related to a software error back to the data segment corresponding to the node.

For an efficient evaluation, it is advantageous that the anomaly in the plurality of temporally successive trace lines for determining the software error is output in the form of a graphic representation of a regression problem and/or classification problem. When formulating the deep neural network as a regression and/or classification problem, the deep neural network is trained on the basis of known traces with known error patterns in both cases, which is to say it is subject to supervised learning, with the upstream graph neural network not requiring any labeled training data. A label is understood to mean a piece of information by means of which it is possible to assess the labeled data.

In the classification problem, a trace is assigned to a known error pattern, for example an error in the context of DNS, the network, the system time. The deep neural network provides an output for each error class and the predictions arising from this are compared with the labels of the traces, for example with the aid of the cross-entropy. Using error backpropagation, the trainable parameters of the deep neural network are adjusted in such a way that the cross-entropy is minimized, for example. The classification occurs for the step in which the temporally successive trace lines are acquired in the anomaly detection method, for example when the sliding window is moved over the traces.

In the case of the regression problem, the deep neural network can make a statement about an error probability, which is to say a statement regarding the likelihood that a trace line is related to an error; this can be carried out as an addition to, or in a manner complementing, the classification problem. Like in the case of the classification problem, the traces and the trace lines contained therein are labeled or marked (by experts). Moreover, two errors that are independent of one another may be present in one trace, for example an incorrect system time and modem problems; this can be considered within the scope of the labeling. The Manhattan metric or the Euclidean distance can be used as an error function, with other error functions being possible.

There is an increase in the efficiency of the anomaly detection method if, within an upstream step, the graph neural network and/or the deep neural network is/are trained with trace lines of an intended behavior and/or trace lines of known software errors as ground truth for supervised learning. This allows supervised learning.

In a further example, in addition to trace lines of the trace output by the controller of the vehicle, trace lines of further traces from a backend are translated into the graph representation in order to increase an available data set of trace lines and/or in order to increase the evaluation reliability using the training of the graph neural network and/or deep neural network. This serves to increase the efficiency of the determination of software errors in the considered trace lines vis-à-vis an efficiency without the addition of further traces.

It is also possible and advantageous for the graph neural network and/or the deep neural network to be retrained using trace lines of traces of a test fleet of further vehicles in a downstream step. This serves to increase the efficiency of determining software errors in the considered trace lines vis-à-vis an efficiency without the addition of the trace lines of traces of the test fleet.

It is particularly advantageous, proceeding from the time of the anomaly in the plurality of temporally successive trace lines as the output of the deep neural network, to determine trace lines connected to the software error using an evaluation of the embedded representation, the node list, the lookup table, and the graph representation, wherein trace lines connected to the software error are used to identify the software error, create an availability map of the services in the vehicle, and/or determine trace lines which are connected to a potential software error.

Relevant nodes, and hence trace lines, are determined once the deep neural network has predicted/determined/output an anomaly in the timestamp on the basis of the temporal features, which is to say the embedded features of the nodes of the plurality of temporally successive trace lines, and the most similar/dependent embedded features. In this case, the associated trace line and the nodes of its data segments are identified using the node with the timestamp. It is possible to resort to an input interface of the deep neural network for nodes of the plurality of temporally successive trace lines in temporal sequence. For the nodes of the data segments of the anomaly-afflicted trace line at the time output by the deep neural network, further relevant nodes, and hence data segments of the trace lines, are identified by evaluating the distance metric. An assignment to the trace lines can be implemented via the input interface of the deep neural network and the lookup table.

The trace lines connected to the software error allow the user to easily determine whether there is an erroneous behavior in the present traces and/or whether the erroneous behavior can be assigned to an already known error pattern. The cause to which an erroneous behavior can be traced back, for example erroneous software/operation, can be determined more easily using the trace lines connected to the software error. Moreover, the relevant trace lines give the user the option of determining the fact that the determined software error is reproducible, substantially simplifying error analysis and error rectification or even rendering them possible in the first place.

For each error prediction, which is to say each time of an error probability as an output event of the deep neural network, where a confidence or error probability of the deep neural network is greater than a predetermined threshold value, the nodes can be fed back to the anomaly detection in this way and the most similar features, for example the N most similar features, can be identified, for example using the cosine similarity, with the aid of the embedded representation and the lookup table. The nodes with the most similar features can be determined using the embedded representation. The trace lines linked to the software error can then be rendered identifiable to the user, for example by marking the trace lines with the nodes having these features, which is to say by marking the relevant trace lines. Other ways of displaying the relevant trace lines are possible, for example by masking trace lines not relevant to the error. Additionally, error-relevant data segments in the relevant trace lines can be marked or otherwise highlighted for the user. The anomaly detection method or the anomaly detection algorithm can be trained to identify software errors, to create the availability map of services, and to locate trace lines which are related to a potential error. Already classified error patterns can be used to retrain the deep neural network.

The anomaly detection method can run particularly efficiently and quickly if the graph neural network is designed as DeepWalk and the deep neural network is designed as a recurrent neural network, in particular as a long short-term memory.

It is particularly advantageous if, in order to determine the software error, the deep neural network is used to carry out a temporal evaluation of the translated trace lines and the graph neural network is used to determine a relationship between the translated trace lines using a semantic of the translated trace lines. In this way, it is possible to efficiently and quickly determine even software errors arising due to a long effective chain between the first and second nodes, which cause the error (first node) and cause the latter to occur (second node).

The present subject matter also comprises a system for learning-based anomaly detection in order to determine a software error in a networked vehicle. The system comprises a translation unit comprising an interface for inputting trace lines, for translating trace lines of a trace, for example available in the DLT format, as a file with a temporal sequence of function calls of software components of a controller, output by this controller of the vehicle, into a graph representation of an undirected graph in order to provide a node list with weighted links between nodes, which each represent individual data segments of the translated trace lines. It further comprises a first input interface for inputting the node list into a graph neural network, in order to output, for each node of the node list and in an embedded representation, similarities and dependencies of this node with respect to other nodes of the node list as embedded features, for example in the floating-point format, sorter for sorting the embedded features of nodes of the plurality of temporally successive trace lines in a temporal sequence on the basis of a timestamp of each translated trace line and augmenting the embedded features of the nodes of the plurality of temporally successive trace lines with most similar embedded features of nodes, which are determined using a distance metric proceeding from nodes of at least one of the plurality of temporally successive trace lines, and a second input interface for inputting the most similar embedded features in addition to the embedded features of the nodes of the plurality of temporally successive trace lines into a deep neural network, in order to output a time of an error probability and/or error class of an anomaly in the plurality of temporally successive trace lines in order to determine the software error. The system according to the present subject matter has advantages and effects corresponding to those of the method according to the present subject matter. The translation unit, first input interface, the sorter, and the second input interface can be present as separate or integrated functional units.

The term module (and other similar terms such as unit, subunit, submodule, etc.) in the present disclosure may refer to a software module, a hardware module, or a combination thereof. Modules implemented by software are stored in memory or non-transitory computer-readable medium. The software modules, which include computer instructions or computer code, stored in the memory or medium can run on a processor or circuitry (e.g., ASIC, PLA, DSP, FPGA, or other integrated circuit) capable of executing computer instructions or computer code. A hardware module may be implemented using one or more processors or circuitry. A processor or circuitry can be used to implement one or more hardware modules. Each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices and stored in memory or non-transitory computer readable medium.

The present subject matter also comprises a computer program having program code for carrying out the method according to the present subject matter when the computer program is executed on a computer. The computer program can be configured to be executed by one or more processors, in order thereby to carry out the method according to the present subject matter. The computer program may be stored on one or more non-transitory storage media. The present subject matter also comprises a non-transitory computer-readable data carrier having program code of a computer program for carrying out the method according to the present subject matter when the computer program is executed on a computer.

Further possible configurations, developments, and implementations of the present subject matter also comprise combinations of features of the present subject matter described hereinabove or hereinbelow in relation to the examples, even if these combinations have not been specified explicitly.

The attached figures should impart further understanding of the examples of the present subject matter. They illustrate examples and, in conjunction with the description, serve to explain principles and concepts of the present subject matter.

BRIEF DESCRIPTION OF THE DRAWINGS

FIGS. 1a to 1d show a schematic system for learning-based anomaly detection in order to determine a software error in a networked vehicle, in accordance with a first example of the present subject matter.

DETAILED DESCRIPTION OF THE DRAWINGS

Unless indicated otherwise, the same reference signs are used below for the same elements and elements with the same effect.

Figure 1B:
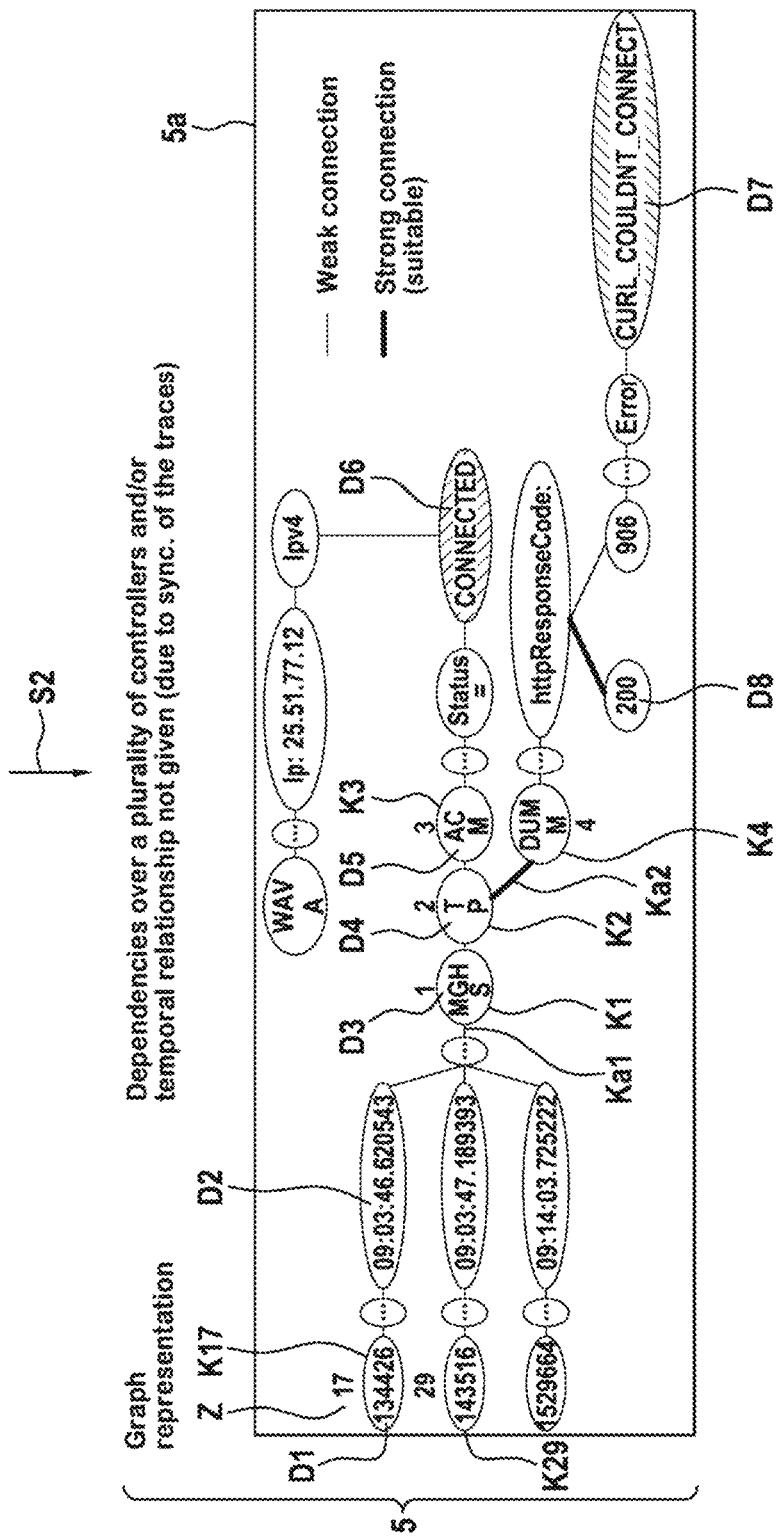

FIG. 1a and FIG. 1b together show a trace 3 which, as a file with a temporal sequence of function calls of software components of a controller 2, in a step S1 is read from the controller 2 of a vehicle 1 into the system according to the present subject matter for learning-based anomaly detection in order to determine a software error in the networked vehicle 1, with trace lines 3a, 3b, 3c encompassed by the trace 3 being translated into a graph representation 5 in a step S2. The vehicle 1, for example an automobile, truck, bus, or motorbike steered by a driver or autonomously, a rail-bound vehicle or an aircraft, may be intermittently or permanently networked with one or more other vehicles and/or a backend server using a wireless communications link. Thus, the trace 3 can be transmitted from the controller 2 of the vehicle 1 to the backend server in step S1 via a response communication of the controller 2 following a request of the backend server. Additionally, the controller 2 can transmit the trace or traces 3 to the backend server automatically after collecting a predetermined number of traces 3 and/or trace lines 3a-3c of the trace 3. Additionally, the trace 3 can be read into the anomaly detection wirelessly or using cables via an interface, for example an onboard interface (OBD), in the vehicle 1.

The trace 3 is traversed with a sliding window 4 from top to bottom, which is to say in the temporal sequence of the trace lines 3a-3c, in order to translate the trace lines 3a-3c into a graph representation 5 (see the arrow with time t). In the present example, the window 4 does not change in size when traversing the sliding window 4, which is to say it always encompasses three trace lines. Alternatively, the window 4 can change in size when traversing the trace 3, which is to say it encompasses fewer or more than three trace lines depending on the time t, the trace 3, and/or the trace lines 3a-3c. Each trace line comprises data segments. Thus, the trace line 3a comprises a running index as data segment D1, a timestamp as data segment D2, a piece of information MGHS as data segment D3, a piece of information TP as data segment D4, a piece of information ACM as data segment D5, and a piece of information CONNECTED as data segment D6. By way of example, the trace line 3b encompasses a piece of information CURL_COULDNT_CONNECT as data segment D7, and a trace line following the trace line 3c encompasses a piece of information 200 as data segment D8. By way of example, the data segments D1-D8 indicate function calls, values, or other communications, which relate to software components of the controller 2 of the vehicle 1.

In the present example, the graph representation 5 comprises an undirected graph 5a, in which all data segments D1-D8 of the trace lines 3a-3c traversed by the window 4 are present as nodes K1-K4, K17, K29 with edges Ka1, Ka2 each connecting two nodes. In the graph 5a, all the nodes K1-K4, K17, K29 are represented by ellipses and all the edges between two nodes are represented as straight lines of different thicknesses. The node K1 represents the data segment D3, the node K2 represents the data segment D4, the note K3 represents the data segment D5, the node K4 represents the data segment with the piece of information DUMM, the node K17 represents the data segment D1 with the running index of the trace line 3a, and the node K29 represents the data segment with the running index of the trace line 3b. In addition to further nodes for other data segments, nodes with the data segments D2, D6, and D7 are likewise contained in the graph 5a. The edge Ka1 connects a node to the node K1 and the edge Ka2 connects the node K2 to the node K4. The more frequently the data segment with the piece of information DUMM is arranged immediately adjacently to the data segment D4 with the piece of information TP in the read trace lines, the stronger the connection between these nodes will be; this is expressed in the graph 5a by a greater thickness of the edge Ka1 in comparison with the thickness of the edge Ka1. It is possible to include nodes and edges of trace lines from a plurality of controllers in the same graph 5a, as indicated by the nodes above the nodes K2 and K3 in the graph 5a, wherein there does not need to be any temporal relationship between the nodes, which is to say the pieces of information of the data segments represented by the nodes. The nodes K1-K4, K17, K29 are labeled to be distinguishable from one another by a running node index Z, which is to say 1-4, 17, 29, like all of the nodes in the graph 5a. While the piece of information CONNECTED in data segment D6 indicates an error-free establishment of a connection, the piece of information CURL_COULDNT_CONNECT in the data segment D7 indicates a software error in the trace 3, which appears by way of the data segment D7 in the trace line 3b.

Figure 1C:
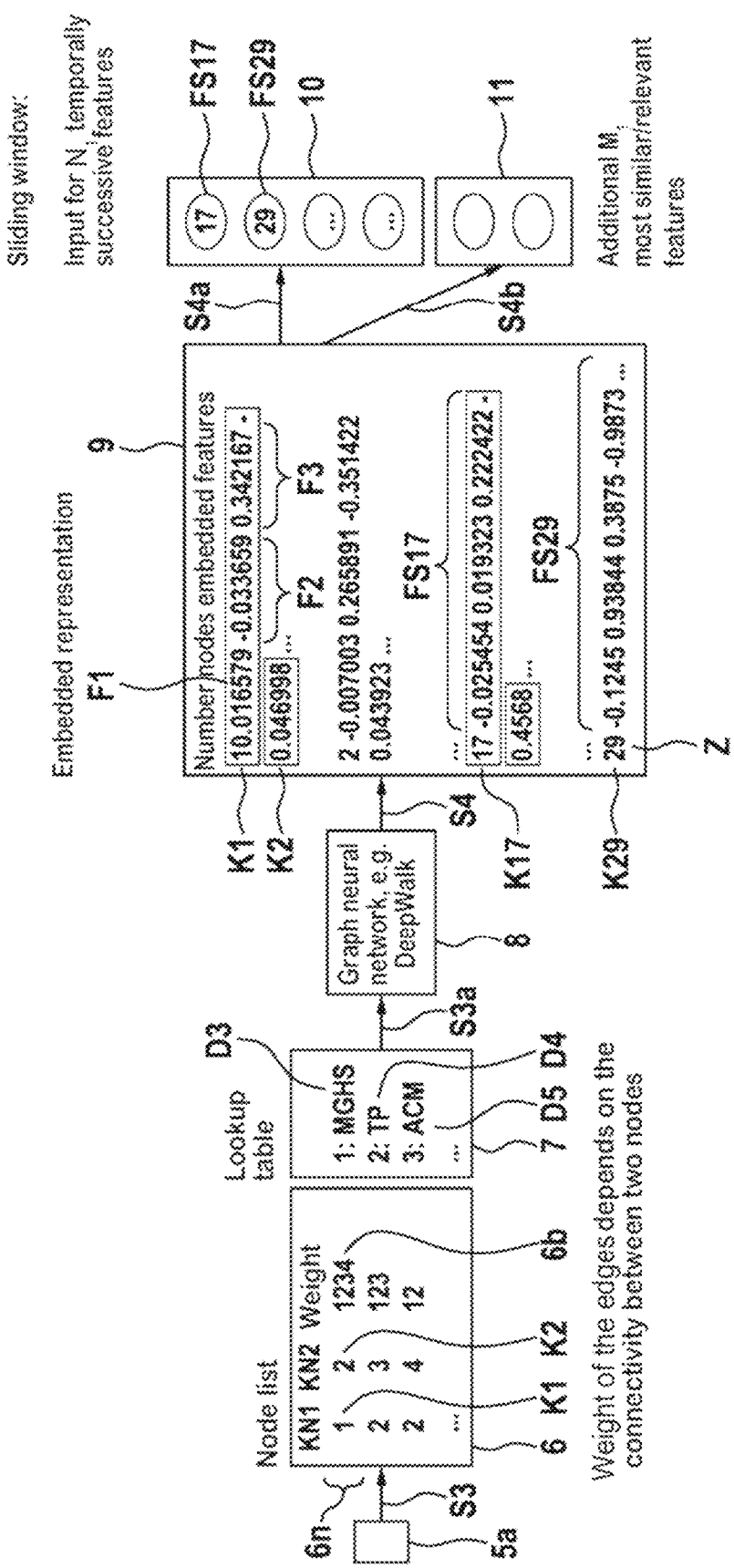

FIG. 1c shows a node list 6 output by the graph 5, with weighted links 6a between the nodes K1-K4, a lookup table 7 with assignments of the node numbers to the pieces of information in the data segments D3-D5, a graph neural network 8, an embedded representation 9 with features F1-F3, FS17, FS29, embedded features 10 of the nodes of the plurality of temporally successive trace lines 3a-3c, and most similar features 11 determined using a distance metric proceeding from the nodes of the trace line 3a with the most recent time stamp, considered in the window 4.

The lookup table 6 is provided in a step 3 by evaluating the content and the structure of the undirected graph 5a, which is to say the nodes K1-K4, K17, K29 and the connections thereof using edges Ka1, Ka2, with each link 6a between two nodes of the graph 5a being assigned a weight 6b. The weight 6b of the link 6a between the nodes K1 and K2 depends on the connectivity between these two nodes and describes the thickness of the edge between the two nodes, which is to say the frequency of the occurrence of immediately adjacent data segments D3 and D4 in the trace lines 3a-3c of the read trace 3 or the read traces. The graph 5a moreover allows the creation of the lookup table 7, which is readable by a user and in which each node index is respectively assigned the pieces of information of the data segments represented by the nodes with the node index. By way of example, the piece of information MGHS from the data segment D3 is assigned to the node index 1.

The node list 6 is input into the graph neural network 8 in a step S3a, wherein, for each node K1-K4, K17, K29 of the node list 6 and in the embedded representation 9, similarities and dependencies of this node to other nodes of the node list 6 are output in a step S4 as embedded features F1-F3, FS17, FS29, in the floating-point format in the present example. Thus, the node K1 is assigned the running node index 1 and, in addition to further embedded features, embedded features F1, F2, and F3. The node K17 is assigned the running node index 17 and the plurality of embedded features FS17, and the node K29 is assigned the running node index 29 and the plurality of embedded features FS29.

Then, in a step S4a, the embedded features F1-F3, FS17, FS29 of nodes of the plurality of temporally successive trace lines 3a-3c of the window 4 are sorted in a temporal sequence on the basis of the timestamp D2 of each translated trace line 3a-3c and, in a further step S4b which can be executed simultaneously or with a time overlap with step S3a, the embedded features 10 of the nodes of the plurality of temporally successive trace lines 3a-3C are augmented by the most similar embedded features 11 of the nodes determined using the distance metric, for example cosine similarity, Euclidean distance metric, or weighted Euclidean distance metric, proceeding from nodes K1-K4, K17, K29 of at least one of the plurality of temporally successive trace lines 3a-3c. In the present example, the input data for the distance metric only uses nodes belonging to the trace line with the most recent timestamp of the sliding window 4, which is to say the trace line 3a, where the timestamp 09:08:46.620543 of the trace line 3 is available as a piece of information in the data segment D2, in the case of the window 4 with the trace lines 3a-3c. It is possible to use N=3 temporally successive trace lines 3a-3c and most similar embedded features 11 of M nodes in the sliding window 4 for the input into a deep neural network 12, with advantageously M being chosen to be approximately equal to N for fast and efficient anomaly detection. From this, NI temporally successive features 10 and M1 most similar or relevant features arise.

Figure 1D:
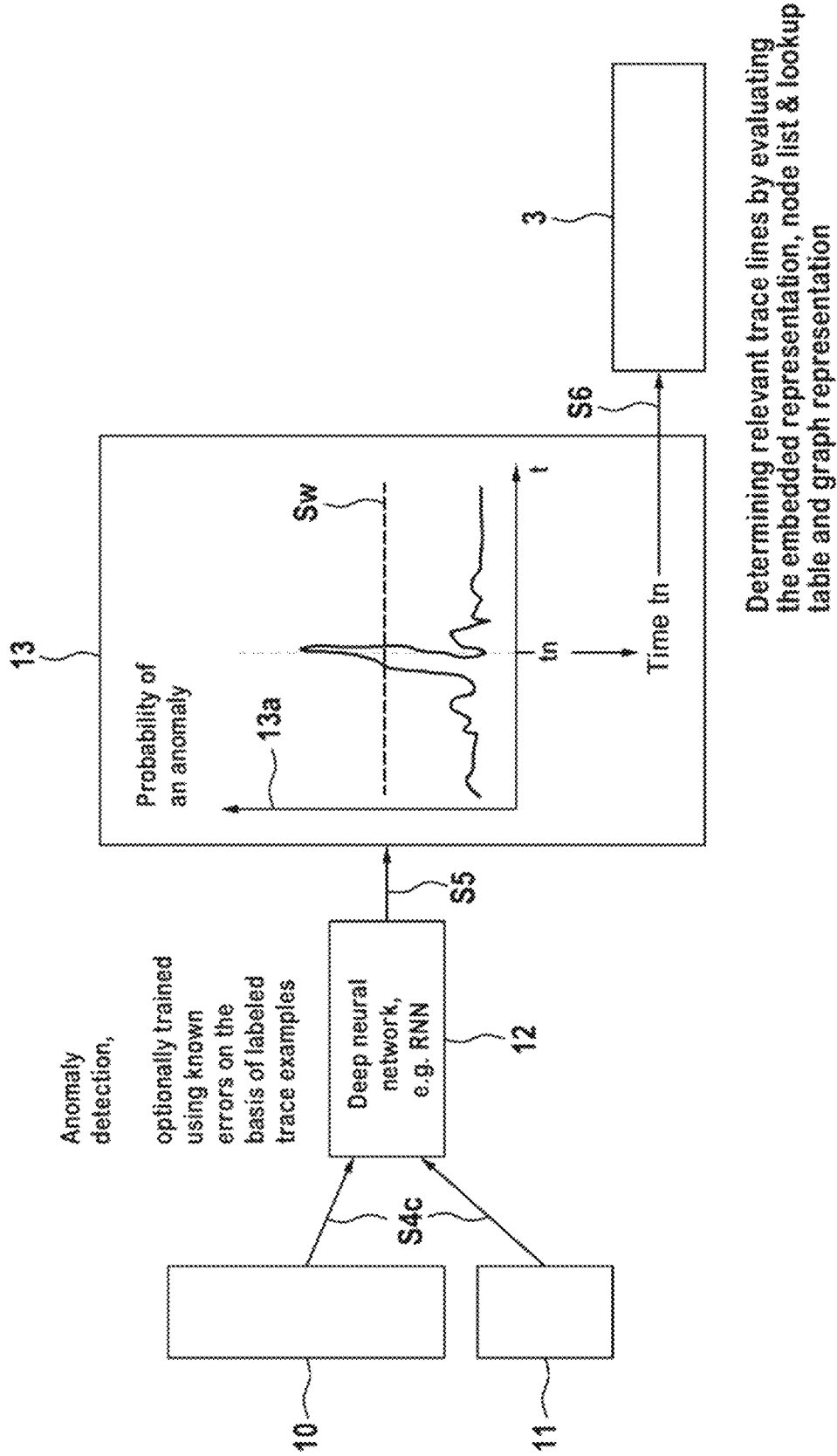

FIG. 1d shows the embedded features 10 of the nodes of the plurality of temporally successive trace lines 3a-3c and the most similar embedded features 11 as input data into the deep neural network 12, the deep neural network 12, a graphic representation 13 of a regression problem as the output of the deep neural network 12, and a return to the trace lines of the trace 3 using a time tn of the occurrence of an anomaly, with a software error being determined at the time tn.

In a step S4c, the most similar embedded features 11 are input into the deep neural network 12 in addition to the embedded features 10 of the nodes K1-K4, K17, K29 of the plurality of temporally successive trace lines 3a-3c, with the time tn of an error probability 13a of an anomaly in the plurality of temporally successive trace lines 3a-3c being output in order to determine the software error. As an alternative or in addition, at least one error class can be output. A threshold value Sw is defined for the error probability 13a, with, in the case of a value for the error probability 13a greater than or equal to the threshold Sw, an anomaly being present or assumed present in order to determine a software error using the time tn at which the threshold value Sw is present.

Proceeding from the time tn of the anomaly in the plurality of temporally successive trace lines 3a-3c determined using the threshold value Sw, trace lines connected to the software error, which is to say relevant trace lines, are determined as functional units of the anomaly detection using an evaluation of the embedded representation 9, the node list 6, the lookup table 7, and the graph representation 5 comprising the graph 5a. For each software error prediction, which is to say for each output of the deep neural network 12 within the scope of the anomaly detection, where the confidence of the deep neural network 12 expressed in terms of the error probability 13a is greater than or equal to the threshold value Sw, the nodes, whose embedded features 10, 11 were taken by the deep neural network 12 as input data, are fed back to the functional units of the anomaly detection in order to determine relevant trace lines in the trace 3.

Figure 2A:
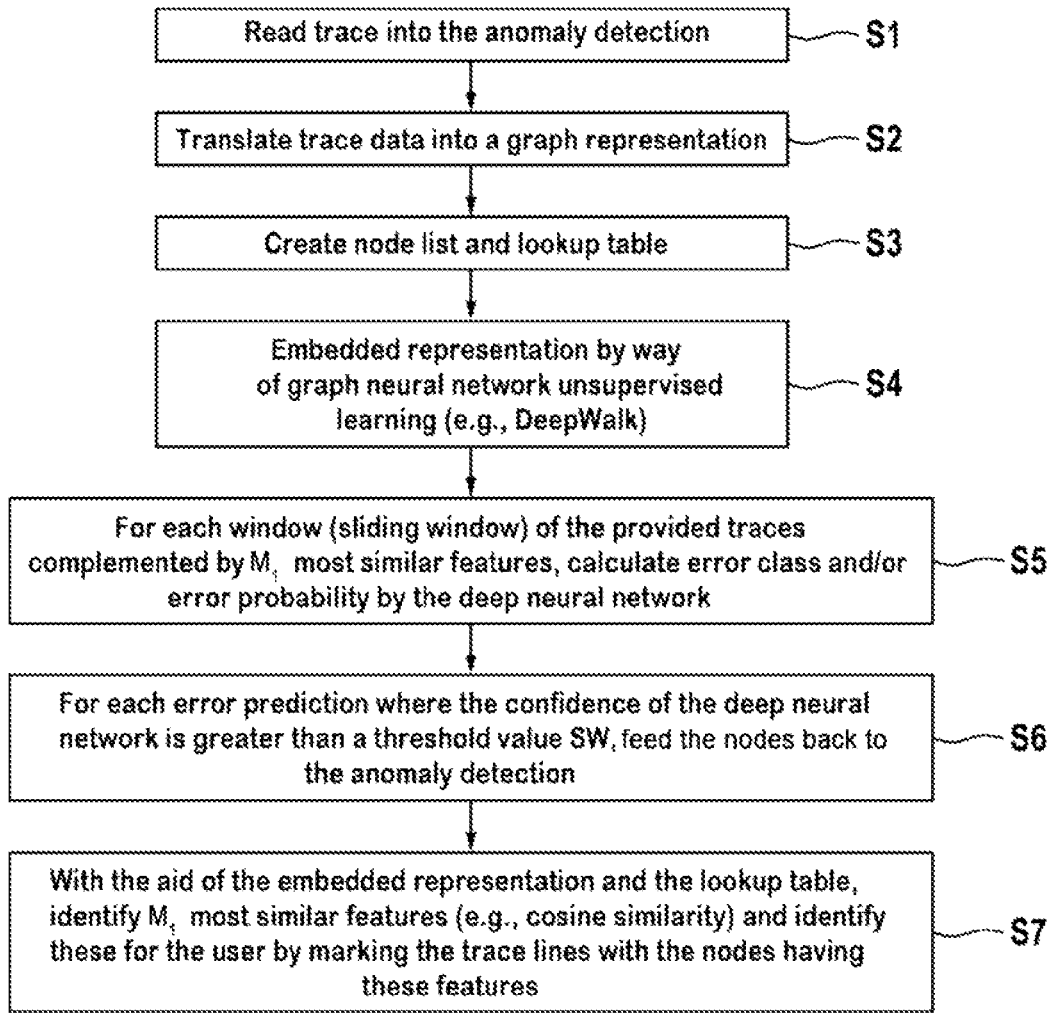
FIG. 2a shows a schematic flowchart with steps for carrying out the method according to the present subject matter, a trace with unknown software errors being used for anomaly detection, in accordance with a second example of the present subject matter.

FIG. 2a shows a schematic flowchart with steps S1 to S7 for carrying out the method according to the present subject matter for anomaly detection, wherein a trace with unknown software errors, for example the unknown software error appearing in the trace 3 as CURL_COULDNT_CONNECT in data segment D7, is used for anomaly detection. The steps S1 to S6 have already been described in the description of FIGS. 1a to 1d and therefore need not be described again. In a step S7, M1 most similar features are identified, for example using the cosine similarity, using the embedded representation 9 and the lookup table 7, and are identified for the user by marking the trace lines in which nodes with these features occur.

Figure 2B:
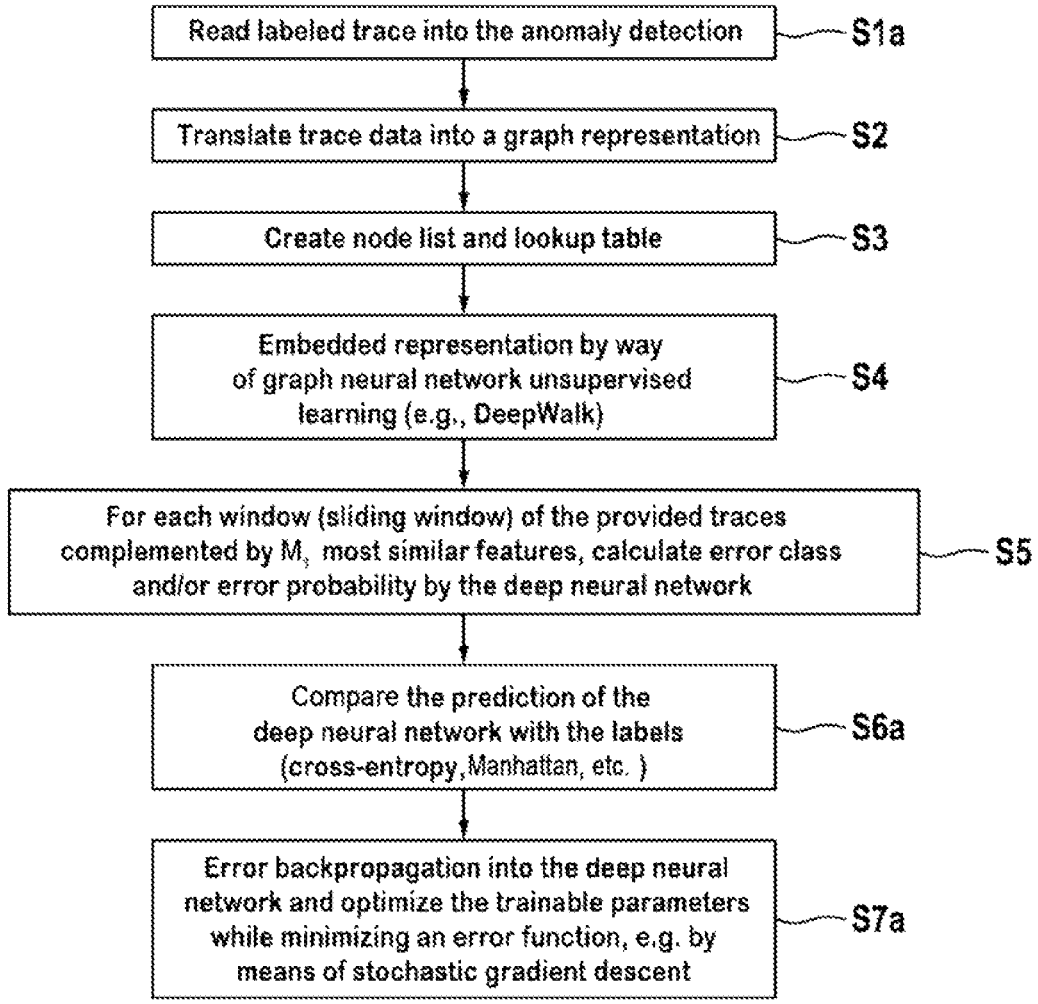
FIG. 2b shows a schematic flowchart with steps for carrying out the method according to the present subject matter, the anomaly detection being trained using a trace with a known software error, in accordance with a third example of the present subject matter.

FIG. 2b shows a schematic flowchart with steps S1a, S2 to S5, S6a, S7a for carrying out the method according to the present subject matter for anomaly detection, wherein the anomaly detection is trained using a trace with a known software error. In a step S1a, a labeled trace, which is to say a trace containing pieces of information by means of which an assessment of the trace is possible, is read into the anomaly detection, which is to say translated into the graph representation 5. Steps S2 to S5 have already been explained in the description of FIGS. 1a to 1d and therefore need not be described again. In a step S6a, a prediction of the deep neural network 12, which is to say the output of the deep neural network 12 within the scope of the anomaly detection, is compared with the labels, for example using cross-entropy, Manhattan distance, etc., and there is a software error backpropagation into the deep neural network 12 and an optimization of the trainable parameters while minimizing an error function, for example using stochastic gradient descent, in a step S7a.

Even though the present subject matter has been illustrated more specifically and explained in detail by preferred examples, the present subject matter is not restricted by the disclosed examples and a person skilled in the art is able to derive other variations therefrom, without departing from the scope of protection of the present subject matter. It is therefore clear that a multiplicity of possibilities for variations exist. Examples mentioned by way of example only represent examples which should not be construed in any way as limiting for instance the scope of protection, the application possibilities, or the configuration of the present subject matter. Instead, the preceding description and the description of the figures enable a person skilled in the art to implement in practice the examples given by way of example, while a person skilled in the art, with knowledge of the disclosed inventive concept, is able to carry out many different changes, for example with regard to the function or the arrangement of individual elements mentioned in an example given by way of example, without departing from the scope of protection that is defined by the claims and their legal equivalents, for instance further explanations in the description.

The features of the present subject matter described with reference to the depicted examples, for example a sliding window with three trace lines as depicted in FIG. 1a, may also be present in other examples of the present subject matter, for example when carrying out step S5, as depicted in FIG. 2a or 2b, unless something else is specified or this is precluded automatically for technical reasons.

What is claimed is:

1. A computer-implemented method for learning-based anomaly detection in order to determine a software error in a networked vehicle, comprising:
   translating trace lines of a trace available in a diagnostic log and trace (DLT) format as a file using a temporal sequence of function calls of software components of a controller of the vehicle;
   outputting, by the controller of the vehicle, a graph representation of an undirected graph;
   providing a node list with weighted links between nodes, wherein
   each weighted link represents individual data segments of the translated trace lines;
   inputting the node list into a graph neural network;
   outputting, as embedded features in a floating-point format, similarities and dependencies of each node with respect to other nodes of the node list in an embedded representation and for each node of the node list;
   sorting the embedded features of nodes of a plurality of temporally successive trace lines into a temporal sequence based on a timestamp of each translated trace line and augmenting the embedded features of the nodes of the plurality of temporally successive trace lines with similar embedded features of nodes determined using a distance metric proceeding from the nodes of at least one of the plurality of temporally successive trace lines;

inputting the similar embedded features into a deep neural network together with the embedded features of the nodes of the plurality of temporally successive trace lines; and outputting a time of an error probability and/or error class of an anomaly in the plurality of temporally successive trace lines to determine the software error.

2. The computer-implemented method according to claim 1, wherein the distance metric is provided as a cosine similarity, Euclidean distance metric, or weighted Euclidean distance metric.

3. The computer-implemented method according to claim 1, further comprising:

using N temporally successive trace lines and the similar embedded features of M nodes in a sliding window for input into the deep neural network.

4. The computer-implemented method according to claim 3, wherein of the N temporally successive trace lines of the sliding window, only the trace line with the most recent timestamp is used to determine the similar embedded features, wherein the similar embedded features of the M nodes are determined using the distance metric proceeding from the nodes of the trace line with the most recent timestamp.

5. The computer-implemented method according to claim 3, wherein

M is equal to N,

M is set equal to 3, 10, or 64.

6. The computer-implemented method according to claim 1, wherein the node list with the weighted links between two nodes is complemented by a lookup table in which each node of the translated trace lines is denoted by a running integer index and is assigned a distinguishable label of numbers and/or letters.

7. The computer-implemented method according to claim 1, further comprising:

outputting the anomaly in the plurality of temporally successive trace lines for determining the software error in the form of a graphic representation of a regression problem and/or classification problem.

8. The computer-implemented method according to claim 1, further comprising:

training, within an upstream step, the graph neural network and/or the deep neural network with trace lines of an intended behavior and/or trace lines of known software errors as ground truth for supervised learning.

9. The computer-implemented method according to claim 1, further comprising:

translating, in addition to trace lines of the trace output by the controller of the vehicle, trace lines of further traces from a backend into the graph representation.

10. The computer-implemented method according to claim 1, further comprising:

retraining, in a downstream step, the graph neural network and/or the deep neural network using trace lines of traces of a test fleet of further vehicles.

11. The computer-implemented method according to claim 6, further comprising:

determining, from the time of the anomaly in the plurality of temporally successive trace lines as the output of the deep neural network, trace lines connected to the software error using an evaluation of the embedded representation, the node list, the lookup table, and the graph representation; and using the trace lines connected to the software error are used to:

identify the software error, create an availability map of services in the vehicle, and/or determine trace lines which are connected to a potential software error.

12. The computer-implemented method according to claim 1, wherein the graph neural network is designed as DeepWalk, and the deep neural network is designed as a long short-term memory (LSTM).

13. The computer-implemented method according to claim 1, further comprising:

carrying out a temporal evaluation of the translated trace lines to determine the software error, and using the graph neural network to determine a relationship between the translated trace lines using a semantic of the translated trace lines.

14. A non-transitory computer-readable medium comprising instructions operable, when executed by one or more computing systems, to:

perform the method of claim 1.

* * * * *